(12) United States Patent
Miller

(10) Patent No.: US 6,170,752 B1
(45) Date of Patent: Jan. 9, 2001

(54) PLASTIC CARD TRANSPORT APPARATUS AND INSPECTION SYSTEM

(75) Inventor: Andrew Miller, Kitchener (CA)

(73) Assignee: NBS Technologies, Inc., Ontario (CA)

( * ) Notice: Under 35 U.S.C. 154(b), the term of this patent shall be extended for 0 days.

(21) Appl. No.: 09/521,213

(22) Filed: Mar. 8, 2000

Related U.S. Application Data (62) Division of application No. 09/168,856, filed on Oct. 9, 1998.

(51) Int. Cl.$^7$ .................................................. G06K 13/04
(52) U.S. Cl. ........................ 235/475; 235/486; 271/145; 271/149
(58) Field of Search .................................. 235/475, 483, 235/485, 486, 384; 271/144, 145, 149, 226

(56) References Cited

U.S. PATENT DOCUMENTS

| | | | |
|---|---|---|---|
| 1,271,508 | * 7/1918 | Hall | 211/51 |
| 3,612,337 | * 10/1971 | Harger | 220/22.3 |
| 4,013,172 | * 3/1977 | Foreman | 211/51 |
| 4,021,032 | * 5/1977 | Gross et al. | 271/166 |
| 4,344,146 | 8/1982 | Davis, Jr. et al. | 382/141 |
| 4,364,475 | * 12/1982 | D'Elia | 206/425 |
| 4,458,816 | 7/1984 | Horino et al. | 209/548 |
| 4,493,420 | 1/1985 | Dennis | 209/587 |
| 4,496,056 | 1/1985 | Schoenig, Jr. et al. | 209/539 |
| 4,509,075 | 4/1985 | Simms et al. | 348/129 |
| 4,561,819 | 12/1985 | Wiernicki | 414/331.17 |
| 4,569,445 | 2/1986 | Kovats et al. | 209/539 |
| 4,570,180 | 2/1986 | Baier et al. | 382/145 |
| 4,640,056 | 2/1987 | Stump | 451/300 |
| 4,733,360 | * 3/1988 | Kobayashi et al. | 705/40 |
| 4,898,268 | 2/1990 | Kamioka et al. | 198/345.1 |
| 4,900,168 | * 2/1990 | LaManna et al. | 400/130 |
| 4,965,829 | 10/1990 | Lemelson | 382/101 |
| 5,060,275 | 10/1991 | Hirano | 382/100 |
| 5,570,450 | * 10/1996 | Fernandez et al. | 385/135 |
| 5,648,651 | 7/1997 | Inoue | 235/475 |
| 5,806,844 | * 9/1998 | Bailey et al. | 271/145 |
| 5,837,991 | 11/1998 | LaManna et al. | 235/475 |

\* cited by examiner

Primary Examiner—Karl D. Frech
Assistant Examiner—Diane I. Lee
(74) Attorney, Agent, or Firm—Antonelli, Terry, Stout & Kraus, LLP (57) ABSTRACT

A card hopper for receiving plastic cards that are to be fed to a card processing apparatus. The hopper includes an elongated trap member having a bottom surface and first and second side surfaces. A layer of fiber material on each of the side surfaces holds plastic cards received in the card hopper in a substantially vertical position and substantially aligned one behind another. Preferably, the fiber material has fibers extending at substantially 90 degrees from the side surfaces, with the fibers being spaced in the order of about 10/1000-inch apart and at a depth of pile in the order of about 3/16-inch.

2 Claims, 6 Drawing Sheets

PLASTIC CARD TRANSPORT APPARATUS AND INSPECTION SYSTEM

This application is a divisional application of Ser. No. 09/168,856, filed Oct. 9, 1998.

BACKGROUND OF THE INVENTION

The present invention pertains to a plastic card transport apparatus and to a plastic card inspection system including such plastic card transport apparatus. More particularly, the present invention pertains to a plastic card transport apparatus and plastic card inspection system in which plastic cards are supported by one edge as they are transported from a card input location to a card inspection location for inspection and then to a card output location at which the inspected plastic card is discharged from the plastic card transport apparatus. The card output location is selected from a plurality of card output locations on the basis of the inspection results.

Plastic cards are increasingly used as a means of personal identification and in commerce. By way of examples, many organizations issue plastic identification cards to their members to indicate membership in the organization. Credit cards and automatic teller machine cards likewise are often plastic cards. The front face of such a plastic card often has writing and a logo on it, and frequently also a hologram. The rear face frequently has a magnetic strip and a signature panel and may also have a bar code. Such plastic cards generally conform with the International Organization for Standardization (ISO) Standard CR80.

The manufacture of such plastic cards is generally automated. However, inspection of each card is necessary to assure that the card complies with the ISO CR80 Standard and has a clean front surface with proper writing, a proper logo and a proper hologram and a clean back surface with a proper magnetic strip, signature panel, and bar code area. Such plastic cards are widely used, and so are manufactured in large numbers. At present, automated inspection of each card is seldom used because it requires expensive, complex equipment and because of difficulty in transporting the plastic cards through the inspection system. Automated inspection equipment is becoming more economical and easier to use. Nevertheless, automated inspection of plastic cards is still not widely done because of difficulty in transporting the cards through the inspection system. If the plastic cards are transported from the card input location, past the card inspection location and to a card output location by supporting the cards on one of their faces, there is a danger of damaging the card surface. Consequently, such plastic cards are most often inspected manually at present. However, manual inspection is slow and too often inaccurate. Not only is it subjective, but it becomes repetitive and boring for the inspectors, who might have their attention drawn away by nearby distractions.

SUMMARY OF THE INVENTION

The present invention is a plastic card transport apparatus in which the plastic cards are supported on one edge while being transported from one card operation location to another card operation location. The present invention is also a plastic card inspection system, including plastic card transport apparatus for transporting plastic cards from a card input location, to a card inspection location for inspection, and then to a card output location selected from a plurality of card output locations on the basis of the inspection results.

In accordance with the present invention a plastic card transport apparatus includes a plurality of lower support wheel members which are positioned with their circumferential surfaces aligned to define a card transport path. A plurality of card operation locations are positioned along the card transport path. The lower support wheel members support each plastic card by a lower edge of the card as the plastic card is transported along the card transport path from a first one of the card operation locations to a second one of the card operation locations. An upper retaining means is positioned above the lower support wheel members to engage an upper edge of the plastic card. The upper retaining means cooperates with the lower support wheel members to retain the plastic card supported on the lower support wheel members as the plastic card is transported along the card transport path. A drive source continuously drives selected ones of the lower support wheel members to move the plastic card along the card transport path between card operation locations. A controller responds to a control signal by driving a selected one of the lower support wheel members adjacent a first one of the card operation locations to move the plastic card along the card transport path from that first one of the card operation locations to an adjacent one of the continuously driven lower support wheel members, and so the plastic card is transported to a second one of the card operation locations. A signal source provides the control signal as needed. Preferably, a lower guide extends along a portion of the card transport path and cooperates with the lower support wheel members to retain the lower edge of the plastic card on the lower support wheel members. Preferably, also, the upper retaining member is a plurality of upper wheel members.

The plastic card inspection system includes a plurality of lower support wheel members, upper retaining means, and a drive source as in the plastic card transport apparatus. In the plastic card inspection system, the card operation locations include a card input location, a card inspection location, a first card output location, and a second card output location. A plastic card input supply provides plastic cards to the card input location. First and second card receivers receive plastic cards from the first and second card output locations. A card inspection device inspects the plastic cards at the card inspection location and provides an inspection signal indicative of the results of the inspection. A card input means adjacent the card input location responds to the inspection signal by inputting a plastic card from the card input location to an adjacent one of the continuously driven lower support wheel members so that the inputted plastic card is transported to the card inspection location for inspection. A first control means responsive to each inspection signal drives a first selected one of the lower support wheel members, adjacent the card inspection location, to move the inspected plastic card along the card transport path from the card inspection location to an adjacent one of the continuously driven lower support wheel members, moving the inspected plastic card along the card transport path to the first card output location. A first card discharging means, adjacent the first card output location, responds to the inspected plastic card being transported to the first card output location following an inspection signal indicative of a first inspection result by discharging the inspected plastic card from the card transport path to the first card receiver. A second control means responds to an inspection signal indicative of a second inspection result by driving a second selected one of the lower support wheel members, adjacent the first card output location, to move the inspected plastic card along the card transport path from the first card output location to an adjacent one of the continuously driven lower support wheel members, moving the inspected plastic card along the card transport path to the second output location. A second card discharging means, adjacent the second card output location, responds to the inspected card being transported to the second card output location following an inspection signal indicative of the second inspection result by discharging the inspected plastic card from the card transport path to the second card receiver.

When the card inspection simply determines whether each plastic card has met certain criteria or not, the first and second card receivers separate cards that have passed the inspection and cards that have failed the inspection. If the inspection is to separate cards into more than two groups in response to inspection signals indicative of more than two types of inspection results, then the card transport apparatus extends to one or more additional card output locations, each of which is provided with a card discharging means and a card receiver.

BRIEF DESCRIPTION OF THE DRAWINGS

These and other aspects and advantages of the present invention are more apparent from the following detailed description and claims, particularly when considered in conjunction with the accompanying drawings. In the drawings:

DETAILED DESCRIPTION OF A PREFERRED EMBODIMENT

Figure 1:
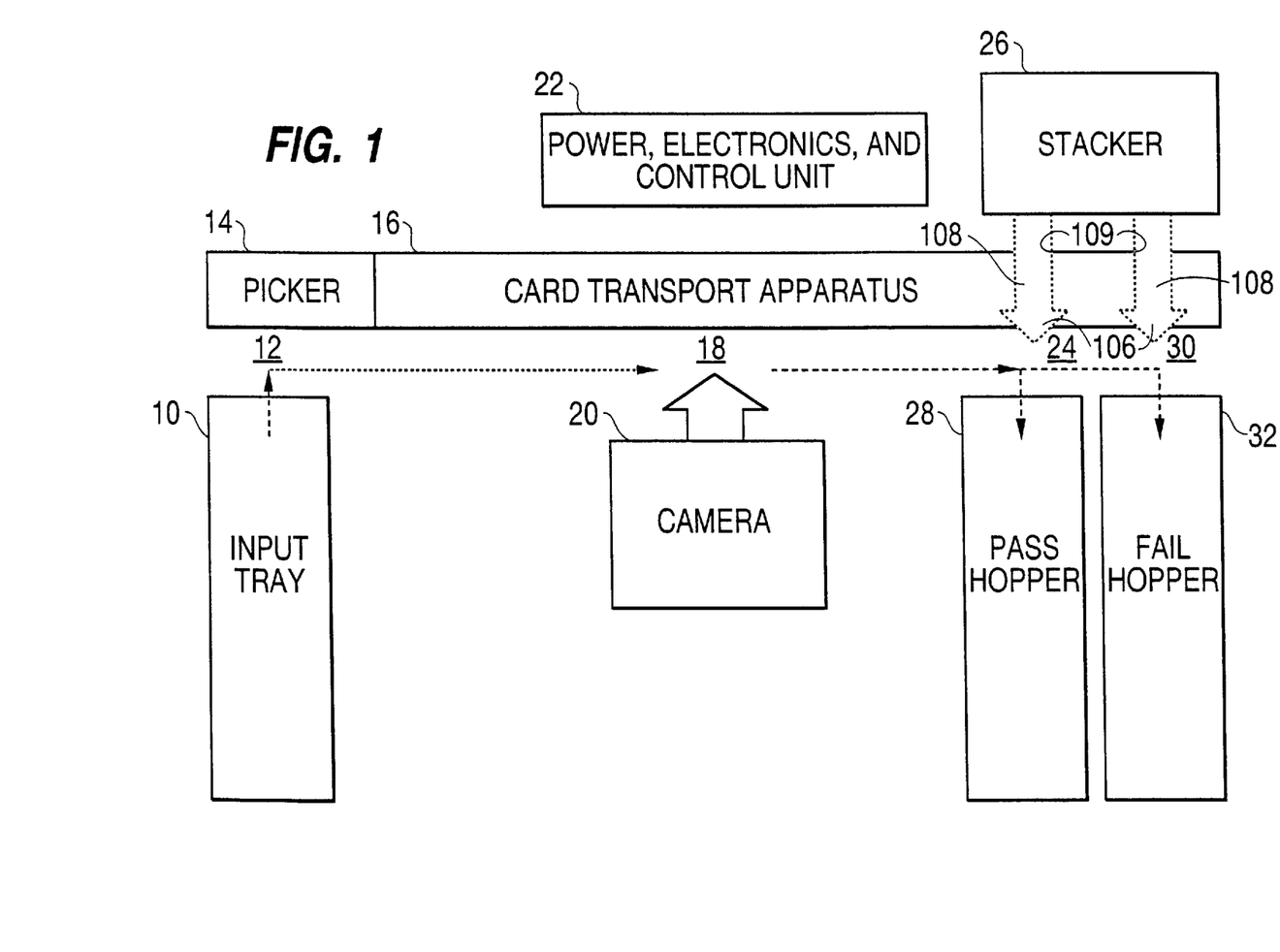
FIG. 1 is a schematic block diagram of a plastic card inspection system in accordance with a preferred embodiment of the present invention.

FIG. 1 depicts in block diagram form a plastic card inspection system in accordance with a preferred embodiment of the present invention. Plastic cards to be inspected are stacked in input tray 10 which includes a biasing arm or other means for urging the cards toward card input location 12. A picker 14 picks one card at a time from card input location 12 and feeds the card to card transport apparatus 16 in which the card is transported to a card inspection location 18. The card is then inspected by a digital camera 20, such as a DVT 7000 Series Smartimage Sensor made by DVT Corporation of Norcross, Georgia, and various parameters of the card are compared with data within a memory in power, electronics, and control unit 22. The card is then transported to a first card output location 24. If the comparison shows that the card meets specified inspection criteria, then stacker 26 discharges the card by ejecting the card to a first output hopper 28. On the other hand, if the comparison shows that the card does not meet the specified inspection criteria, or that the card meets a second set of inspection criteria, then the card transport apparatus 16 transports the card on to a second card output location 30, and stacker 26 discharges the card by ejecting the card to a second output hopper 32. When the plastic card inspection system is inspecting newly manufactured plastic cards to determine whether they are acceptable, for example whether their surfaces are clean and their writing, logo, hologram, magnetic strip, signature panel, bar code and other features are clean and proper, then first output hopper 28 might be a pass hopper and second output hopper 32 a fail hopper, as indicated in FIG. 1. Cards that pass the inspection are ejected by stacker 26 to pass hopper 28, while cards that fail the inspection are ejected to fail hopper 32. Picker 14, card transport apparatus 16, digital camera 20, and stacker 26 are controlled by power, electronics, and control unit 22.

Figure 2:
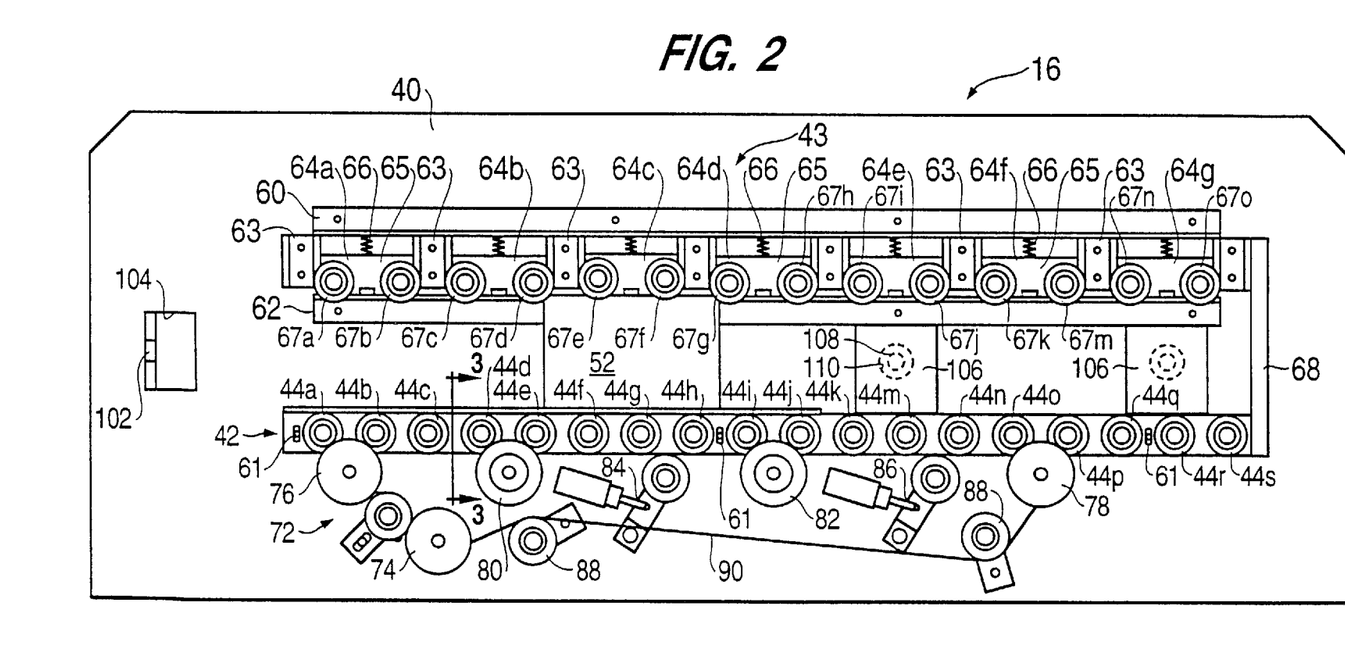
FIG. 2 is a front plan view of a plastic card transport apparatus in accordance with the present invention, suitable for incorporation into the plastic card inspection system of FIG. 1.
Figure 3:
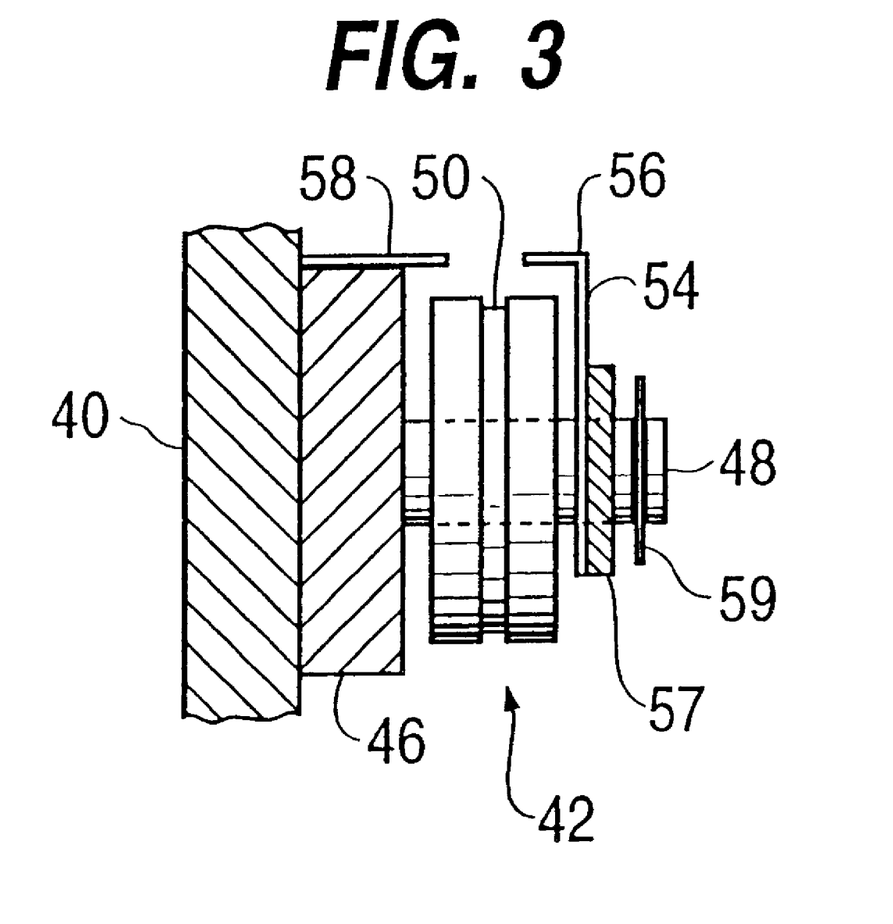
FIG. 3 is a fragmentary sectional view taken along lines 3—3 of FIG. 2.

FIGS. 2 and 3 depict a preferred form of a card transport apparatus 16. Back plate 40 has mounted on it a lower card support unit 42 and an upper card retaining unit 43. Lower card support unit 42 includes a plurality of support wheels depicted in FIG. 2, as eighteen support wheels 44a–44s, each of which is rotatably attached to a first elongated support bar 46 by a support shaft 48. Each wheel 44 has a circumferential groove 50 into which cards to be inspected fit. Thus, when a card 52 is supported in the card transport apparatus 16, the card is supported in the grooves 50 of one or more of the wheels 44.

Preferably, a transparent guide member 54 is attached to the support shafts 48 outward of wheels 50 and includes an inturned flange 56 which extends toward backplate 40 and cooperates with a flange 58 that is mounted on the top surface of support bar 46 to extend toward the flange 56. Guide member 54 can be held on the support shafts 48 by a retaining bar 57 and by retaining clips 59 which are clipped on the support shafts 48. Flange 58 can be mounted on support bar 46 by an adhesive or other suitable means. As seen in FIG. 2, outer guide member 54 extends from lower support wheel 44a to lower support wheel 44j, and because guide member 54 is transparent, it does not prevent camera 20 from inspecting any area of card 52.

Lower card support unit 42 is preferably mounted on back plate 40 by adjustable mounting members 61 which permit minor adjustment of the vertical position of the lower card support unit.

Upper card retaining unit 43 includes an upper mounting bar 60 and a lower mounting bar 62 which cooperate with a plurality of side mounting members 63 to mount a plurality of bogey wheel assemblies, depicted in FIG. 2 as seven bogey wheel assemblies 64a–64g. Each bogey wheel assembly 64a–64g includes a support block 65, which is mounted in a vertically movable manner between two of the side mounting members 63, and a spring 66 which biases the support block toward lower mounting bar 62. Each support block 65 rotatably supports two bogey wheels, FIG. 2 thus depicting fourteen bogey wheels 67a–67o. Preferably, an end bar 68 bridges the output ends of lower card support unit 42 and upper card retaining unit 63 to assure that cards 52 do not fall off the end of card transport apparatus 16.

As each plastic card 52 is transported on card transport apparatus 16, the plastic card is supported on lower support wheels 44a–44s and is retained on the apparatus by the cooperation of groove 50 in the lower support wheels 44a–44s, flange 56 on transparent guide member 54, flange 58, and bogey wheels 67a–67o. Thus, as depicted by plastic card 52 in FIG. 2, when the lower edge of the card is resting in the grooves 50 of wheels 44, the upper edge of the card acts on the pair of bogey wheels 67 of one of the bogey wheel assemblies 64 above the card to raise that bogey wheel assembly 64 and its wheels 67 against the urging of its spring 66. This helps hold the lower edge of the plastic card 52 in the grooves 50 of the lower support wheels 44. Each bogey wheel assembly 64a–64g is raised in turn as the card is transported along card transport apparatus 16, while those bogey wheel assemblies not being raised by the card are biased downwardly by their springs 67.

A drive unit 72 causes the plastic cards to be transported along the card transport apparatus 16. Drive unit 72 includes a drive wheel 74 which is continuously rotated by appropriate drive means, such as an electric motor (not shown), driven wheels 76 and 78 at the two ends of drive unit 72, first and second belt positioning wheels 80 and 82, first and second drive control assemblies 84 and 86, and tensioning wheels 88. A drive belt 90 passes around this assemblage of wheels as depicted in FIG. 2 to rotate all those wheels.

Wheels 76 and 80 of drive unit 72 are positioned to hold the segment of belt 90 that passes between those two wheels against the adjacent lower card support wheels 44a–44e of lower card support unit 42 so that so long as the motor is rotating drive wheel 74, belt 90 causes wheels 44a–44e to continuously rotate to transport cards. Likewise, wheel 82 is positioned to cause drive belt 90 to continuously rotate the pair of wheels 44i and 44j adjacent lower card support wheel 82. In like manner, wheel 78 positions drive belt 90 to continuously rotate lower card support wheels 44o and 44p that are adjacent wheel 78.

A plastic card to be transported is fed into the card transport apparatus 16 from picker 12 until the card contacts lower support wheel 44a adjacent wheel 76. Since wheels 44a–44e are being continuously driven, they transport the card along the card transport apparatus beyond wheel 44e. As the card comes to each of the bogey wheel assemblies 64a–64c, the support block 65 of that bogey wheel assembly is urged upwardly against the biasing of its spring 66. However, when the card moves from lower support wheel 44e, the card is no longer being driven. Consequently, the card comes to rest with its upper leading edge adjacent bogey wheel 67g, as depicted in FIG. 2, since there is insufficient force to move the card beneath wheel 67g and raise the support block 65 of bogey wheel assembly 64d against the urging of its spring 66. In this card position, the upper trailing edge of the card 52 is adjacent bogey wheel 67d, as also depicted in FIG. 2. The card is thus positioned in the card inspection location 18.

The card 52 is then inspected by camera 20, and power, electronics, and control unit 22 generates an inspection signal indicative of the results of the inspection. By way of example, if the rear surfaces of the cards are being inspected as to placement and quality of a magnetic strip, a signature panel, and/or a bar code area, then the inspection signal can indicate whether these features on the card are satisfactory or not, and also whether the rear surfaces are clean. Similarly, if the plastic cards are being sorted into several categories, the inspection signal can indicate the category to which the inspected plastic card belongs.

Figure 4A:
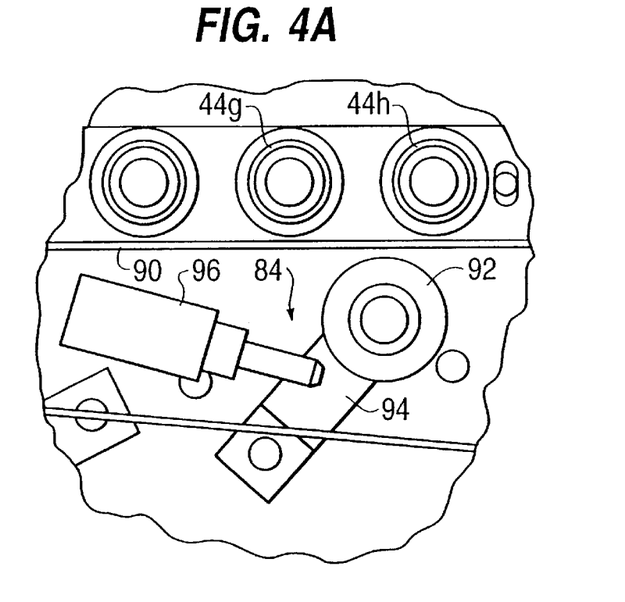
FIG. 4A is an enlarged fragmentary view of one component on the card transport apparatus of FIG. 2 when in a first condition.
Figure 4B:
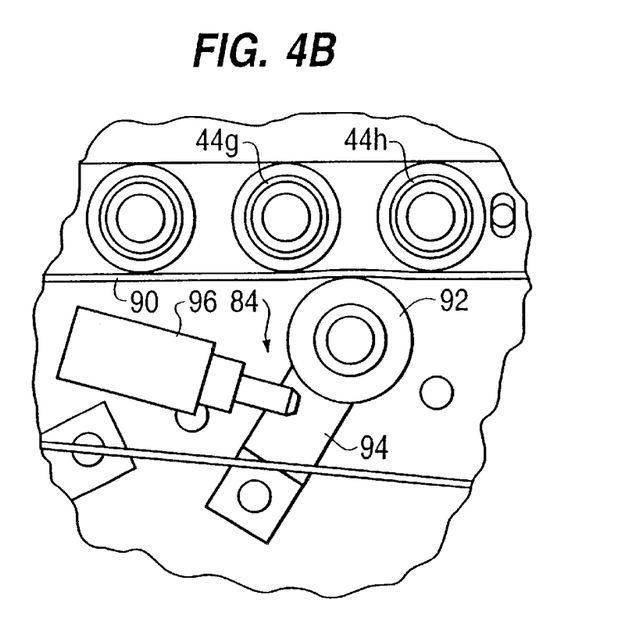
FIG. 4B is an enlarged fragmentary view similar to FIG. 4A, but showing the component in a second condition.

When this inspection signal is generated, indicating that the inspection by camera 20 has been completed, first drive control assembly 84 is activated to forward the card from card inspection station 18, and picker 12 is activated to introduce another card to card transport apparatus 16. FIGS. 4A and 4B are enlarged views of first drive control assembly 84, which includes a wheel 92 that is rotatably mounted on one end of an arm 94, the second end of which is pivotably mounted on back plate 40. A solenoid 96 is mounted on back plate 40 and has its arm connected to pivotable arm 94 so that when the solenoid is not activated, as in FIG. 4A, wheel 92 is withdrawn from drive belt 90, and so the drive belt does not drive the adjacent lower support wheels 44g and 44h. When solenoid 96 is activated, as in FIG. 4B, wheel 92 is pushed against drive belt 90 to bring the drive belt into contact with lower support wheels 44g and 44h, causing those wheels to rotate. Second drive control assembly 86 is similarly made adjacent lower support wheels 44m and 44n. Driving of lower support wheels 44g and 44h drives the card 52 along the card transport apparatus to continuously driven lower support wheels 44i and 44j which continue to drive the card until the trailing edge of the card clears wheel 44j. The card is then positioned on lower support wheels 44k, 44m, and 44n at first card output location 24.

If the card has passed the inspection, then power, electronics, and control unit 22 activates stacker 26 to eject the card to card pass hopper 28. However, if the card has failed the inspection, then stacker 26 is not activated, but instead power, electronics, and control unit 22 activates the solenoid 96 of second drive control assembly 86 to raise its arm 94 and wheel 92, bringing drive belt 90 into contact with lower support wheels 44m and 44n, causing those wheels to rotate. The card is then driven further along the card transport apparatus by wheels 44m and 44n and continuously driven lower support wheels 44o and 44p. When the trailing edge of the card clears wheel 44p, the card rests on lower support wheels 44q, 44r, and 44s, which are not driven. The card is then positioned at the second card output location 30. End plate 68 assures that the card does not fall from the end of lower card support unit 42, but instead comes to rest on wheels 44q, 44r and 44s. Power, electronics, and control unit 22 then activates stacker 26 to eject the card to card fail hopper 32. Guide member 54, with its flange 56, extends only to wheel 44j so that cards can be ejected at first card output location 22 and second output location 28.

As illustrated in FIG. 2, picker 12 includes a picking finger 102 which extends through an opening 104 in back plate 40 to a position adjacent the trailing edge of the forward-most card in input tray 10 at card input location 12. When power, electronics, and control unit 22 activates picker 14, finger 102 is moved by a motor, solenoid, or similar mechanism to push that forward-most card 52 toward continuously driven lower support wheel 44a of card transport apparatus 16 (to the right in FIG. 2).

Stacker 24 includes a pair of pusher plates 106, one adjacent each of the card output locations 24 and 30. When power, electronics, and control unit 22 determines that a plastic card is to be ejected at first card output location 24, and the card reaches that location, unit 22 activates a motor, solenoid, or similar mechanism (not shown), which is positioned behind back plate 40 at location 24, to extend a rod 108 that passes through an opening 109 in the back plate, causing the pusher plate 106 at location 24 to push the plastic card from card transport apparatus 16 to pass output hopper 28. Likewise, if power, electronics, and control unit 22 determines that the plastic card is to be ejected at second card output location 30, once the card has arrived there unit 22 activates the mechanism for that output location, extending its rod 108 through its opening 109, and so causing the pusher plate 106 for that location to eject the card to fail output hopper 32.

Figures 5, 6:
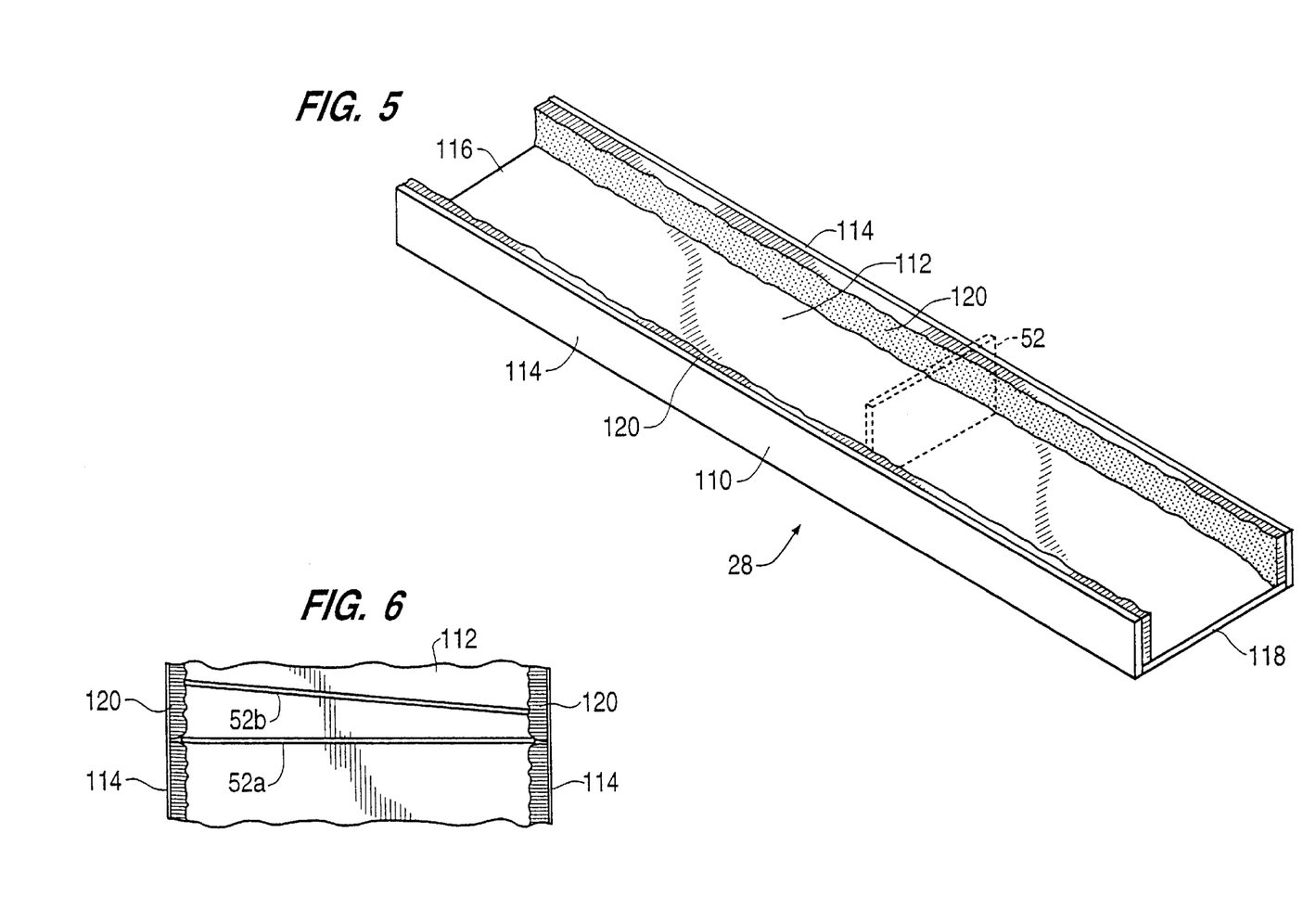
FIG. 5 is a perspective view of a card output hopper suitable for use in the plastic card inspection system of FIG. 1 in accordance with the present invention.
FIG. 6 is a fragmentary top plan view showing a portion of the plastic card output hopper of FIG. 5.

FIGS. 5 and 6 depict a tray 110 suitable for use as pass output hopper 28. Tray 110 includes a lower surface 112 and first and second side surfaces 114. The input end 116 of tray 110 is opened to receive cards ejected to the pass output hopper by stacker 26. FIG. 5 depicts the opposite end 118 of tray 110 open; however, that end can be closed by an end surface, if desired.

The interior surface of each side surface 114 is covered with a layer of fiber material 120, for example, a material having fibers extending at substantially 90° degrees from the side surfaces 114 with the fibers spaced about 10/1000 inch apart and a depth of pile of about 3/16 inch.

As plastic cards are pushed into hopper 28 by stacker 26, each card is held in a substantially vertical position by the fibers of the two layers of material 120 on the two sides 114 of the tray, as depicted by plastic card 52 in FIG. 5. Generally, the cards are aligned substantially perpendicular to the sides 114 of tray 110, as shown by plastic card 52a in FIG. 6. However, even if one side of the card is advanced relative to the opposite side, as depicted by plastic card 52b in FIG. 6, nevertheless, the card is held substantially vertically by the fibers 120 and subsequent cards align themselves behind that first card. As a consequence, once a group of cards has been ejected into the tray 110, the cards can readily be grasped and lifted together from the tray.

If desired, a similar tray can be used for fail output hopper 32. However, if the failed cards are to be discarded, then it is not necessary that they be aligned when removed from the output hopper, and so the layers of fiber material 120 might be omitted.

The fiber material 120 is preferably a nylon fabric such as might be used as a paint edger. Any other material having suitable fibers might likewise be used, for example, a thin layer of carpet or artificial turf or similar material.

Figure 7:
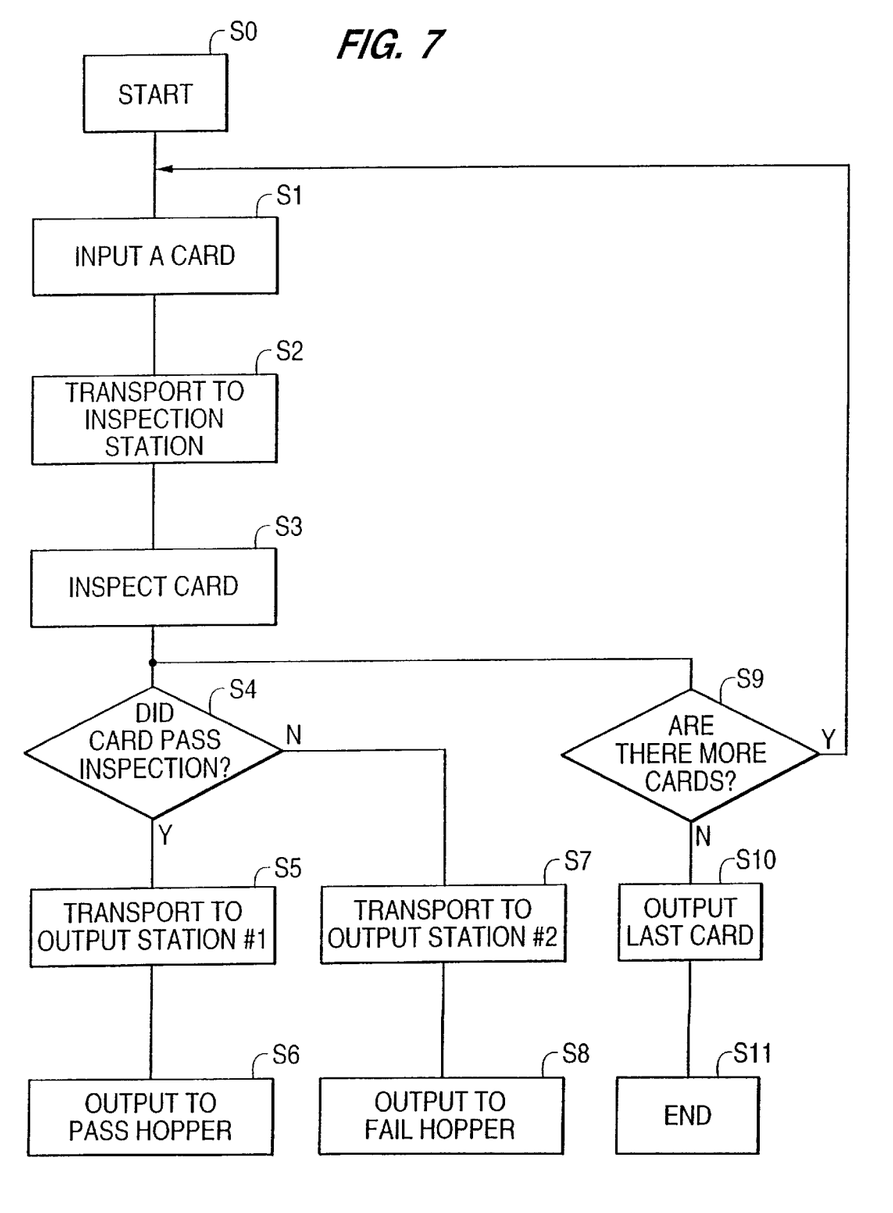
FIG. 7 is a flow chart of a representative manner of operation of the plastic card inspection system of the present invention.

While it is believed that the operation of the plastic card inspection system is clear from FIG. 2 and its description, FIG. 7 is a flow chart of that operation as controlled by power, electronics, and control unit 22. When the plastic card inspection system is activated to start the inspection in step S0, picker 14 inputs a card in step S1, and that card is transported by card transport apparatus 16 to card inspection station 18 in step S2. Camera 20 then inspects the card in step S3. In step S4 it is determined whether the card passed the inspection. If so, the card is transported to first card output station 24 in step S5, and then the card is ejected to pass output hopper 28 in step S6. If the card did not pass the inspection, then from step S4 the card is transported to the second card output station 30 in step S7, and in step S8 the card is ejected to fail output hopper 32.

Following inspection of the card in step S3, it is determined in step S9 whether there are more cards at card input location 12 awaiting inspection. If so, then the flow returns to step S1 to inspect the next card. If there are no more cards awaiting inspection, then once step S10 determines that the last card has been outputted to either pass output hopper 28 or fail output hopper 30, the process is ended in step S11.

When the plastic card inspection system classifies the cards into two groups, such as pass and fail, then two output stations and two output hoppers can be utilized. If the inspection system classifies the inspected cards into more than two groups, then an output station and an output hopper are provided for each group. In that event, step S4 might be broken down into sub-steps to determine the proper classification group for each inspected card, and the process includes a step of transporting and outputting, similar to steps S5 and S6 and steps S7 and S8, for each group.

It is thus seen that the present invention provides a plastic card transport apparatus in which the plastic cards are transported while contacted only by their edges, and a plastic card inspection system utilizing such a plastic card transport apparatus in which the plastic cards are discharged at a card output location selected from a plurality of card output locations on the basis of the inspection results.

Although the present invention has been described with reference to preferred embodiments, still various alterations, rearrangements, and substitutions might be made, and still the result would be within the scope of the invention.

What is claimed is:

1. A card hopper for receiving cards, said card hopper comprising:
    an elongated tray member having a bottom surface and first and second side surfaces; and
    a layer of fiber material on each of said side surfaces to engage end surfaces of cards received in said card hopper so as to hold the cards in a substantially vertical position and substantially aligned one behind another.

2. A card hopper as claimed in claim 1, wherein said fiber material has fibers extending at substantially 90° from said side surfaces, with said fibers spaced in the order of about 10/1000 inch apart and a depth of pile in the order of about 3/16 inch.

* * * * *